United States Patent
Fujii et al.

(10) Patent No.: US 12,157,846 B2
(45) Date of Patent: Dec. 3, 2024

(54) METHOD FOR PRODUCING HOT MELT ADHESIVE AND HOT MELT ADHESIVE

(71) Applicant: MORESCO CORPORATION, Kobe (JP)

(72) Inventors: Mamiko Fujii, Hyogo (JP); Maki Samitsu, Hyogo (JP); Masashi Ishioka, Hyogo (JP); Takashi Matsumoto, Hyogo (JP); Eiji Kusunoki, Hyogo (JP)

(73) Assignee: MORESCO CORPORATION, Hyogo (JP)

( * ) Notice: Subject to any disclaimer, the term of this patent is extended or adjusted under 35 U.S.C. 154(b) by 705 days.

(21) Appl. No.: 17/433,076

(22) PCT Filed: Feb. 14, 2020

(86) PCT No.: PCT/JP2020/005843
§ 371 (c)(1),
(2) Date: Aug. 23, 2021

(87) PCT Pub. No.: WO2020/175187
PCT Pub. Date: Sep. 3, 2020

(65) Prior Publication Data
US 2022/0372340 A1   Nov. 24, 2022

(30) Foreign Application Priority Data
Feb. 26, 2019   (JP) ................ 2019-032653

(51) Int. Cl.
*C09J 7/00* (2018.01)
*C09J 7/10* (2018.01)
*C09J 7/35* (2018.01)

(52) U.S. Cl.
CPC ............ *C09J 7/35* (2018.01); *C09J 7/10* (2018.01); *C09J 2301/304* (2020.08)

(58) Field of Classification Search
CPC .......... C09J 7/35; C09J 7/10; C09J 2301/304
See application file for complete search history.

(56) References Cited

U.S. PATENT DOCUMENTS

| | | | |
|---|---|---|---|
| 4,094,942 A | 6/1978 | Nakai et al. | |
| 5,736,621 A | 4/1998 | Simon et al. | |
| 2003/0096908 A1 | 5/2003 | Heilmann et al. | |
| 2003/0212210 A1 | 11/2003 | Heilmann et al. | |
| 2003/0216519 A1 | 11/2003 | Heilmann et al. | |
| 2010/0210789 A1 | 8/2010 | Seidel et al. | |
| 2016/0009965 A1 | 1/2016 | Robert | |
| 2017/0166785 A1 | 6/2017 | Hussein | |
| 2017/0292047 A1 | 10/2017 | Sustic et al. | |
| 2018/0355228 A1 | 12/2018 | Fowler et al. | |
| 2019/0002742 A1 | 1/2019 | Sustic et al. | |
| 2019/0071592 A1 | 3/2019 | Sustic et al. | |
| 2019/0144719 A1* | 5/2019 | Wang | ............ B32B 27/12 156/334 |
| 2019/0233685 A1 | 8/2019 | Fowler et al. | |
| 2019/0241482 A1 | 8/2019 | Fowler et al. | |
| 2019/0241774 A1 | 8/2019 | Sustic et al. | |
| 2019/0367784 A1 | 12/2019 | Sustic et al. | |
| 2020/0377771 A1 | 12/2020 | Robert | |
| 2022/0372340 A1 | 11/2022 | Fujii et al. | |

FOREIGN PATENT DOCUMENTS

| CN | 206493568 | 9/2017 |
|---|---|---|
| EP | 0 527 225 | 2/1993 |
| EP | 2 808 371 | 12/2014 |
| JP | 9-12695 | 1/1997 |
| JP | 2002-322288 | 11/2002 |
| JP | 2004-292654 | 10/2004 |
| JP | 2004-532926 | 10/2004 |
| JP | 2005-53995 | 3/2005 |
| JP | 2010-180387 | 8/2010 |
| JP | 2011-1464 | 1/2011 |
| JP | 2012-518063 | 8/2012 |
| JP | 2016-17180 | 2/2016 |
| JP | 2016-141064 | 8/2016 |
| JP | 2017-125181 | 7/2017 |
| JP | 7038254 | 3/2022 |
| WO | 92/15621 | 9/1992 |
| WO | 2018/219805 | 12/2018 |

OTHER PUBLICATIONS

International Search Report issued Mar. 10, 2020 in International (PCT) Application No. PCT/JP2020/005843 May 25, 2021 in corresponding Japanese Application No. 2021-501946, with partial.
Notice of Reasons for Rejection issued May 25, 2021 in corresponding Japanese Application No. 2021-501946, with partial English translation.
Extended European Search Report issued Feb. 16, 2022 in corresponding European Patent Application No. 20763275.3.
Notice of Reasons for Refusal issued Sep. 5, 2023 in corresponding Japanese Patent Application No. 2021-192304, with machine English language translation.
Chinese Office Action issued Dec. 2, 2022 in Chinese Patent Application No. 202080015874.8, with English partial translation.

* cited by examiner

*Primary Examiner* — Anshu Bhatia
(74) *Attorney, Agent, or Firm* — Wenderoth, Lind & Ponack, L.L.P.

(57) ABSTRACT

One aspect of the present invention relates to a method for producing a hot-melt adhesive, comprising: introducing a fluid into a heating kneader while or after kneading a hot-melt adhesive material in a liquid state, at an amount of 0.3 parts by mass or more with respect to 100 parts by mass of the hot-melt adhesive material; and performing vacuuming while heating stirring or dispersing the hot-melt adhesive material and the fluid so as to come into contact with each other.

8 Claims, No Drawings

METHOD FOR PRODUCING HOT MELT ADHESIVE AND HOT MELT ADHESIVE

TECHNICAL FIELD

The present invention relates to a method for producing a hot-melt adhesive.

BACKGROUND ART

A polymer material used for a hot-melt material contains a slight amount of residual volatile organic compounds (hereinafter, referred to as "VOC" as well), such as a raw material and a polymerization solvent. The volatile organic compounds are often vaporized or transferred from a solidified adhesive. Particularly in the automobile field, volatile components accumulated in a respirable air in a passenger cell may generate an unpleasant odor or may be possibly concerned with health matters. Furthermore, the volatile components may be accumulated on a cool surface of a window shield or the like to cause an invisibility (fogging incident). Additionally, the hygienic material field experiences in recent years consumers' complaints against an odor coming off a sealed bag when the bag is opened.

The VOC components are partly removable by a conventional way of heating and vacuuming, but no way for producing a hot-melt adhesive is established to achieve removal of a slight amount of residual VOC components in the material (see Patent Literature 1).

Therefore, there is currently no choice but to select a polymer material containing fewer volatile components therein in order to blend a hot-melt adhesive with a low odor at a low-VOC level.

However, such selection of the polymer material containing the fewer volatile components has drawbacks that the design scope for the blending technique is narrow and thus it is difficult to provide a hot-melt adhesive which meets the needs of adhesive performance.

An object of the present invention is to solve the aforementioned drawbacks. Specifically, an object of the present invention is to provide a hot-melt adhesive with a low odor and a low-VOC level regardless of materials.

CITATION LIST

Patent Literature

Patent Literature 1: Japanese Unexamined Patent Publication No. 2012-518063

SUMMARY OF INVENTION

The present inventors found that a configuration to be described below could achieve the aforementioned object after a great deal of studies for solving the drawbacks, then reconsidered the studies under the found knowledge, and finally completed the present invention.

Specifically, a method for producing a hot-melt adhesive according to one aspect of the present invention comprises: introducing a fluid into a heating kneader while or after kneading a hot-melt adhesive material in a liquid state, at an amount of 0.3 parts by mass or more with respect to 100 parts by mass of the hot-melt adhesive material; and performing vacuuming while heating stirring or dispersing the hot-melt adhesive material and the fluid so as to come into contact with each other.

DESCRIPTION OF EMBODIMENTS

As described above, a method for producing a hot-melt adhesive according to the present invention comprises: introducing a fluid into a heating kneader while or after kneading a hot-melt adhesive material in a liquid state, at an amount of 0.3 parts by mass or more with respect to 100 parts by mass of the hot-melt adhesive material; and performing vacuuming while heating stirring or dispersing the hot-melt adhesive material and the fluid so as to come into contact with each other.

This configuration can facilitate production of a hot-melt adhesive with a low odor and a low-VOC level even in use of a material containing a large amount of VOC or a material with a strong odor, thereby achieving both the adhesive performance and a low odor and a low-VOC level. This configuration further eliminates the necessity of using a special material, and therefore increases the selectivity of blending setting and attains a cost reduction. In other words, the present invention can provide a hot-melt adhesive with a low odor and a low-VOC level that is applicable to a variety of industrial fields without any limitation to material selection.

Hereinafter, an embodiment according to the present invention will be described in detail, but the present invention should not be limited thereto.

First, hot-melt adhesive materials adoptable in the embodiment include a base resin, a tackifier, and other additive, which are conventionally used for a hot-melt adhesive, without any particular limitation. Particularly, the producing method according to the embodiment can provide a hot-melt adhesive with a low odor at a low-VOC level even if any hot-melt adhesive material is used.

Specific examples of such a material adoptable as the base resin include a thermoplastic polymer, which is used as a component constituting the hot-melt adhesive, without any particular limitation. Specific examples of the thermoplastic polymer include an elastomer thermoplastic polymer, a polyolefin thermoplastic polymer, an ethylene-vinyl acetate copolymer (EVA) thermoplastic polymer, a polyacrylate thermoplastic polymer, a polyester thermoplastic polymer, and a polyamide thermoplastic polymer.

The elastomer thermoplastic polymer is not particularly limited as long as the polymer is used as an elastomer-based thermoplastic polymer in the hot-melt adhesive. Examples of the thermoplastic polymer include a conjugated diene polymer which is a polymer having a structure unit (conjugated diene unit) based on a conjugated diene compound. Furthermore, specific examples of the elastomer thermoplastic polymer include a thermoplastic block copolymer which is a copolymer of the conjugated diene compound and vinyl aromatic hydrocarbon. In other words, the aforementioned thermoplastic block copolymer is preferably used as the thermoplastic polymer.

The conjugated diene compound is not particularly limited as long as the compound is a diolefin compound having at least a pair of conjugated double bonds. Specific examples of the conjugated diene compound include: 1,3-butadiene; 2-methyl-1,3-butadiene (isoprene); 2,3-dimethyl-1,3-butadiene; 1,3-pentazien; and 1,3-hexadiene.

The vinyl aromatic hydrocarbon is not particularly limited as long as the hydrocarbon is aromatic hydrocarbon having a vinyl group. Specific examples of the vinyl aromatic hydrocarbon include: styrene; o-methylstyrene; p-methylstyrene; p-tert-butylstyrene; 1,3-dimethylstyrene; α-methyl styrene; vinylnaphthalene; and vinylanthracene.

The conjugated diene polymer may be a hydrogenated conjugated diene copolymer of a hydrogenation type, or a non-hydrogenated conjugated diene copolymer of a non-hydrogenation type.

A thermoplastic block copolymer preferably serves as the thermoplastic polymer. Specific examples of the thermoplastic block copolymer include a styrene-butadiene block copolymer, a styrene-isoprene block copolymer, a hydrogenated styrene-butadiene block copolymer, and a hydrogenated styrene-isoprene block copolymer. The copolymers include an ABA type triblock copolymer. Examples of the styrene-butadiene block copolymer include a styrene-butadiene-styrene block copolymer (SBS). Examples of the styrene-isoprene block copolymer include a styrene-isoprene-styrene block copolymer (SIS). Examples of the hydrogenated styrene-butadiene block copolymer include a styrene-ethylene-butylene-styrene block copolymer (SEBS). Examples of the hydrogenated styrene-isoprene block copolymer include a styrene-ethylene-propylene-styrene block copolymer (SEPS).

The polyolefin thermoplastic polymer is not particularly limited as long as the polymer is used as a polyolefin thermoplastic polymer in the hot-melt adhesive. Examples of a homopolymer and a copolymer of polyolefin include poly-$\alpha$-olefin based on ethylene, propene and/or butene, atactic poly-$\alpha$-olefin (APAO), and an ethylene/$\alpha$-olefin copolymer and a propylene/$\alpha$-olefin copolymer.

The EVA thermoplastic polymer is not particularly limited as long as the polymer is used as an EVA thermoplastic polymer in the hot-melt adhesive, and may be, for example, a copolymer synthesized from ethylene and vinyl acetate, or the like.

The polyacrylate thermoplastic polymer is not particularly limited as long as the polymer is used as a polyacrylate thermoplastic polymer in the hot-melt adhesive. Examples of the polyacrylate thermoplastic polymer include a block copolymer composed of polymethyl methacrylate and polybutyl acrylate.

The polyester thermoplastic polymer is not particularly limited as long as the polymer is used as a polyester thermoplastic polymer in the hot-melt adhesive. Examples of the polyester thermoplastic polymer include polyester polymerized with dimer acid.

The polyamide thermoplastic polymer is not particularly limited as long as the polymer is used as a polyamide thermoplastic polymer in the hot-melt adhesive. Examples of the polyamide thermoplastic polymer include nylon. The base resins listed above may be used alone or in combination of two or more.

For the tackifier, aromatic series, aliphatic series, alicyclic series, natural products, and hydrogen additives, and other series or additives are adoptable without any particular limitation. Examples of the tackifier can include natural rosin, denatured rosin, hydrogenated rosin, glycerol ester of natural rosin, glycerol ester of denatured rosin, pentaerythritol ester of natural rosin, pentaerythritol ester of denatured rosin, pentaerythritol ester of hydrogenated rosin, a copolymer of natural terpene, a three-dimensional polymer of natural terpene, a hydroxy derivative of a copolymer of hydrogenated terpene, a polyterpene resin, a hydroxy derivative of a phenol-based denatured terpene resin, aliphatic petroleum hydrocarbon resin, a hydroxy derivative of the aliphatic petroleum hydrocarbon resin, an aromatic petroleum hydrocarbon resin, a hydroxy derivative of the aromatic petroleum hydrocarbon resin, a cyclic aliphatic petroleum hydrocarbon resin, and a hydroxy derivative of the cyclic aliphatic petroleum hydrocarbon resin. The tackifiers listed above may be used alone or in combination of two or more.

Further, adoptable additives may include an antioxidant, a thermal stabilizer, a light stabilizer, an ultraviolet absorber, a filler, a surfactant, a coupling agent, a colorant, an antistatic agent, a flame retardant, a wax, and a plasticizer.

Examples of the antioxidant include a phenolic antioxidant and an organic sulphur antioxidant. Examples of the phenolic antioxidant include: 2,6-di-tert-butyl-4-methylphenol; n-octadecyl-3-(3,5-di-tert-butyl-4-hydroxyphenyl) propionate; 2-tert-butyl-6-(3-tert-butyl-2-hydroxy-5-methylbenzyl)-4-methylphenyl acrylate; and tetrakis [methylene-3 (3,5-di-tert-butyl-4-hydroxyphenyl) propionate] methane. Examples of the organic sulphur antioxidant include: dilauryl-3,3'-thiodipropionate; dimyristyl-3,3'-thiodipropionate; distearyl-3,3'-thiodipropionate; and pentaerythrityl tetrakis (3-lauryl thiodipropionate). The antioxidants listed above may be used alone or in combination of two or more.

The producing method according to the embodiment comprises a step of introducing a fluid into a heating kneader while or after kneading a hot-melt adhesive material in a liquid state; and a step of performing heating stirring or dispersing; and performing vacuuming.

The step of introducing the fluid into the heating kneader may be performed while kneading the hot-melt adhesive material or after completing the kneading the hot-melt adhesive material, as long as the hot-melt adhesive material is precedingly put into the heating kneader. Preferably, the step is performed after completing the kneading the material. In the embodiment, the term "completing the kneading" means that a hot-melt adhesive material (e.g., a base resin and a tackifier) indicates the state of a uniform fluidity.

For the heating kneader, a typically available producing device for stirring and kneading a hot-melt adhesive is adaptable. For example, general methods for producing a hot-melt adhesive include a continuous processing method and a batched processing method. A ruder, an extruder, a biaxial taper screw, or other device is adoptable as a heating kneader employing the continuous processing method. A stirring kneader, a Bunbury mixer, a kneader, or other device is adoptable as a heating kneader employing the batched processing method.

The fluid to be introduced into the heating kneader is not particularly limited, and may be in any state. That is, the fluid may be in a liquid state or a gas state. Furthermore, the fluid may be in a supercritical state or a subcritical state. Examples of the fluid include a fluid having a viscosity of 10 mPa·s or less, such as a nitrogen gas, an oxygen gas, an argon gas, a helium gas, a carbon dioxide gas, a carbon monoxide gas, an ammonia gas, an air, liquid nitrogen, liquid helium, liquid carbon dioxide, liquid argon, liquid oxygen, methanol, ethanol, 1-propanol, isopropyl alcohol, 2-butanol, normal hexane, diethyl ether, ethyl acetate, acetone, methyl ethyl ketone, tetrahydrofuran, limonene, an aliphatic solvent, and water. The fluids listed above may be used alone or in combination of two or more.

The introduction of the fluid into the heating kneader is performed at an amount of 0.3 parts by mass or more with respect to 100 parts by mass of the hot-melt adhesive material. The introduced amount of less than 0.3 parts by mass less may lead to a decrease in a removal efficiency of VOC components.

It is unnecessary to particularly set an upper limit of the introduced amount because of no concern about deterioration in a VOC reduction effect and decrease in a deodorization effect. However, 50 parts by mass or less are preferable, and 25 parts by mass or less are more preferable with respect to 100 parts by mass of the hot-melt adhesive material in consideration of the cost and a required time for the steps.

The ways of introducing the fluid is not particularly limited in the embodiment, and the fluid may be introduced from above, below, or side of the heating kneader. Specifically, for instance, the fluid in a gas state can be introduced from below and/or the side of the heating kneader, or the fluid in a liquid state can be introduced from below and/or the side of the heating kneader.

After the fluid is introduced into the heating kneader, vacuuming is performed while heating stirring or dispersing the hot-melt adhesive material and the fluid so as to come into contact with each other. A heating temperature at this time is not particularly limited as long as the temperature is equal to or higher than a melting temperature of the hot-melt adhesive material, and thus can be appropriately set depending on a type of the base resin used as the hot-melt adhesive material.

The heating stirring or dispersing can be performed by a conventionally known way in this technical field. Such a way includes using, for example, a paddle, a turbine, a propeller, an anchor, a helical ribbon, a Maxblend, a Fullzone, a screw, a blade, an MR-205, a Hi-F mixer, and a Sanmeler. The devices may be used alone or in combination of two or more.

The vacuuming is preferably performed at an exhaust rate in a volume 0.4 or more times larger than a volume of the heating kneader per minute until a degree of vacuum becomes higher than a gauge pressure of −60 kPa. The vacuuming performed under this condition can sufficiently suppress a residual VOC amount.

The way of vacuuming in the embodiment is not particularly limited. Specifically, the vacuuming can be performed, for example, by depressurizing until the above degree of vacuum with a vacuum pump which is adjusted so as to have the above exhaust rate per minute.

The exhaust rate per minute is more preferably in the same volume or in a volume more times with respect to the volume of the heating kneader. An upper limit of the exhaust rate per minute is not necessarily and particularly set, but is preferably in a volume 17.5 times or less with respect to the volume of the heating kneader from the viewpoints of a facility size increase and a cost reduction.

The vacuuming is more preferably performed at a degree of vacuum higher than a gauge pressure of −90 kPa. An upper limit is not necessarily and particularly set, but the degree of vacuum is preferably lower than a gauge pressure of −101 kPa to avoid a facility damage, a facility size increase, a cost increase, and other defects.

As described above, dispersing a fluid into a hot-melt adhesive material under a specific condition is prospected to allow the fluid to adsorb refractory organic compounds, thereby removing the refractory organic compounds from the hot-melt adhesive material in the vacuuming step. As a result, a hot-melt adhesive with a low odor and a low-VOC level can be provided.

Furthermore, the producing method according to the embodiment may comprise a step of recovering a fluid containing volatile organic compounds by cooling and condensing an exhaust gas exhausted from the heating kneader.

This is advantageous to prolong the life of the vacuum pump.

The recovery rate of the fluid in the recovery step is preferably 60% or higher. This can more effectively suppress the environmental air pollution.

The hot-melt adhesive obtained by the producing method according to the embodiment has 10 ppm or less of residual volatile organic compounds, with a low odor and a low-VOC level. The obtained hot-melt adhesive is hence remarkably industrially applicable. The hot-melt adhesive has a feature of containing much fewer residual volatile organic compounds than those in a conventional hot-melt adhesive produced by selecting a polymer material having a small amount of volatile components therein. Accordingly, the present invention also encompasses a hot-melt adhesive obtained by the producing method according to the embodiment and having 10 ppm or less of residual volatile organic compounds.

As described above, the present specification discloses techniques of various aspects, among which main techniques are summarized below.

A method for producing a hot-melt adhesive according to one aspect of the present invention comprises: introducing a fluid into a heating kneader while or after kneading a hot-melt adhesive material in a liquid state, at an amount of 0.3 parts by mass or more with respect to 100 parts by mass of the hot-melt adhesive material; and performing vacuuming while heating stirring or dispersing the hot-melt adhesive material and the fluid so as to come into contact with each other.

With this configuration, a hot-melt adhesive with a low odor and a low-VOC level is applicable to a variety of industrial fields without any limitation to material selection.

The vacuuming is preferably performed at an exhaust rate in a volume 0.4 or more times larger than a volume of the heating kneader per minute. The vacuuming is preferably performed at a degree of vacuum higher than a gauge pressure of −60 kPa. This is expected to reliably provide the above-described effects.

The producing method preferably further comprises recovering a fluid containing volatile organic compounds by cooling and condensing an exhaust gas exhausted from the heating kneader. Consequently, the life of the vacuum pump can be prolonged.

In the producing method, a recovery rate of the fluid is preferably 60% or higher. This can more effectively suppress the environmental air pollution.

In the producing method, the obtained hot-melt adhesive preferably has 10 ppm or less of residual volatile organic compounds.

EXAMPLES

Hereinafter, Examples of the present invention will be described, but the present invention should not be limited thereto.

First, hot-melt adhesive materials used in Examples will be shown below.

Hot-Melt Adhesive 1: Olefin Hot-Melt One
  Base resin: amorphous-poly α-olefin polymer (VESTPLAST 704 produced by Evonik Industries), 70 parts by mass
  Tackifier: hydrogenated petroleum resin (I-marv P-100 produced by Idemitsu Kosan Co., Ltd.), 30 parts by mass The hot-melt adhesive 1 had a melting temperature of 160° C., a viscosity of 5275 mPa·s, and a softening point of 105° C.

Hot-Melt Adhesive 2: Rubber Hot-Melt One
  Base resin: styrene-isoprene-block polymer (Quintac 3433N produced by Zeon Corporation), 30 parts by mass Tackifier 1: alicyclic petroleum resin hydride (Arkon M100 produced by Arakawa Chemical Industries, Ltd.), 30 parts by mass Tackifier 2: aromatic hydrocarbon resin (FTR-0100 produced by Mitsui Chemicals, Inc.), 20 parts by mass Softener: paraffin oil (DianaFresia W-90 produced by Idemitsu Kosan Co., Ltd.), 20 parts by mass The hot-melt adhesive 2 had a melting temperature of 160° C., a viscosity of 5250 mPa·s, and a softening point of 103° C.

Hot-Melt Adhesive 3: EVA Hot-Melt One

Base resin: ethylene-vinyl acetate copolymer (Ultrathene 722 produced by Tosoh Corporation), 60 parts by mass Tackifier: aliphatic petroleum resin hydride (Quintone R100 produced by Zeon Corporation), 30 parts by mass Wax: Fischer-tropsch wax (GTL Sarawax SX100 produced by Shell), 15 parts by mass Antioxidant: hindered phenol antioxidant (Irganox 1010 produced by BASF Japan Ltd.), 1 part by mass The hot-melt adhesive 3 had a melting temperature of 160° C., a viscosity of 7055 mPa·s, and a softening point of 109° C.

Hot-Melt Adhesive 4: Acrylic Hot-Melt One

Base resin: polymethyl methacrylate-polybutyl acrylate block copolymer (KURARITY LA3320 produced by Kuraray Co., Ltd.), 30 parts by mass Tackifier: aromatic hydrocarbon resin (FTR-2120 produced by Mitsui Chemicals, Inc.), 30 parts by mass Softener: acrylic polymer (ARUFON UP-1000 produced by Toagosei Co., Ltd.), 40 parts by mass The hot-melt adhesive 4 had a melting temperature of 160° C., a viscosity of 9950 mPa's, and a softening point of 106° C.

Hot-Melt Adhesive 5: Polyester Hot-Melt One

Base resin: hydroxystearic acid ester wax (ITOHWAX E-230 produced by Itoh Oil Chemicals Co., Ltd.), 100 parts by pass The hot-melt adhesive 5 had a melting temperature of 160° C., a viscosity of 600 mPa·s, and a softening point of 70° C.

Hot-Melt Adhesive 6: Polyamide Hot-Melt One

Base resin: hydroxy fatty acid amid (ITOHWAX J-50 produced by Itoh Oil Chemicals Co., Ltd.), 100 parts by pass The hot-melt adhesive 6 had a melting temperature of 160° C., a viscosity of 1050 mPa·s, and a softening point of 76° C.

Method for Producing Hot-Melt Adhesive

For each of the hot-melt adhesives 1 to 6, 2 kg of material was put into a stirring kneader made of stainless steel (SUS) and having a volume of 4 L, and the put material was stirred and melted at a temperature of 165° C. or higher.

Then, each of the fluids shown in Tables 1 to 8 was introduced from the side or/and below by the introduced amount shown in Tables 1 to 8 (at a rate of or mass parts to that of the hot-melt adhesive material). Further, a vacuum pump which was adjusted exhaust rate in a target magnified volume shown in Table 1 per minute to a tank volume (exhaust rate/tank volume) was used to depressurize in the stirring kneader until a target degree of ultimate vacuum. In this way, the hot-melt adhesive according to each of Examples 1 to 31 and Comparative Examples 1 to 9 was obtained.

Evaluation Test: Measurement of Amount of Residual Volatile Organic Compounds (TVOC)

The amount of TVOC was measured by a dynamic headspace method employing a gas chromatograph mass analyzer (GC: 7890B GC system manufactured by Agilent Technologies, MS: GC/MSD system of 5977B series manufactured by Agilent Technologies, and DHS: DHS system manufactured by Gerstel GmbH & Co. KG). A heating temperature was set to 65° C. and a heating time was set to 60 minutes for the sample. A capillary column having an inner diameter of 0.25 mm and a length of 60 m with dimethyl polysiloxane coating (coating thickness of 1.00 µm) was used for the gas chromatograph. The column had a temperature program of heating at 10° C./min from 50 to 300° C., and thereafter keeping for 39 minutes. With this operation, all the substances ranging to n-hexadecane detected by a mass spectrometer were assumed as toluene representing a standard substance, an amount of generated gas was obtained by way of toluene conversion from a calibration curve of the toluene, and then this amount of generated gas was regarded as the TVOC.

The results are shown in Tables 1 to 8.

TABLE 1

| | Adhesive 1 | | | | | | | | | | |
|---|---|---|---|---|---|---|---|---|---|---|---|
| | Example 1 | Example 2 | Example 3 | Example 4 | Example 5 | Example 6 | Example 7 | Comparative Example 1 | Comparative Example 2 | Comparative Example 3 | Comparative Example 4 |
| Supplied fluid | $N_2$ gas | $N_2$ gas | Water | Water | Isopropyl alcohol | Isopropyl alcohol | $CO_2$ gas | — | $N_2$ gas | $N_2$ gas | $N_2$ gas |
| Exhaust rate/volume | 0.45 | 9 | 0.45 | 2.25 | 2.25 | 0.45 | 2.25 | 0.45 | 0.25 | 0.25 | 0.45 |
| Degree of ultimate vacuum | −65 | −95.9 | −95.97 | −98.12 | −95.97 | −98.4 | −95.97 | −95 | −95 | −54.7 | −95 |
| Introduced amount of fluid (HM ratio) | 3.6% | 4.0% | 3.5% | 0.3% | 3.5% | 21.0% | 5.3% | 0.0% | 0.2% | 0.2% | 0.2% |
| TVOC   ppm | 10 | 7 | 10 | 10 | 5 | 6 | 9 | 40 | 21 | 32 | 15 |

TABLE 2

| | Adhesive 1 | | | | | |
|---|---|---|---|---|---|---|
| | Example 8 | Example 9 | Example 10 | Example 11 | Example 12 | Example 13 |
| Supplied fluid | $N_2$ gas | $N_2$ gas | Water | Water | Isopropyl alcohol | Isopropyl alcohol |

TABLE 2-continued

| | Adhesive 1 | | | | | |
| --- | --- | --- | --- | --- | --- | --- |
| | Example 8 | Example 9 | Example 10 | Example 11 | Example 12 | Example 13 |
| Exhaust rate/volume | 0.45 | 0.25 | 0.45 | 0.25 | 0.45 | 0.25 |
| Degree of ultimate vacuum | −54 | −58 | −53 | −52 | −58 | −57 |
| Introduced amount of fluid (HM ratio) | 1.5 | 1.5 | 1.5 | 1.5 | 1.5 | 1.5 |
| TVOC ppm | 9.5 | 10 | 9.5 | 10 | 9.5 | 10 |

TABLE 3

| | Adhesive 1 | | | | | | | | | | | | |
| --- | --- | --- | --- | --- | --- | --- | --- | --- | --- | --- | --- | --- | --- |
| | Example 14 | Example 15 | Example 16 | Example 17 | Example 18 | Example 19 | Example 20 | Example 21 | Example 22 | Example 23 | Example 24 | Example 25 | Example 26 |
| Supplied fluid | Water | Isopropyl alcohol | $CO_2$ Gas | $N_2$ gas | Water | Isopropyl alcohol | $CO_2$ Gas | $N_2$ gas | $N_2$ gas | Isopropyl alcohol | $N_2$ gas | $CO_2$ Gas | $N_2$ gas |
| Exhaust rate/volume | 0.4 | 0.4 | 9 | 9 | 0.4 | 0.4 | 9 | 9 | 9 | 0.4 | 17.5 | 17.5 | 17.5 |
| Degree of ultimate vacuum | −80 | −70 | −80 | −70 | −80 | −70 | −80 | −70 | −101 | −60 | −80 | −90 | −101 |
| Introduced amount of fluid (HM ratio) | 25% | 25% | 25% | 25% | 50% | 50% | 50% | 50% | 50% | 0.3% | 0.3% | 25% | 50% |
| TVOC ppm | 6 | 5 | 5 | 5 | 6 | 5 | 4 | 4 | 3 | 10 | 2 | 3 | 1 |

TABLE 4

| | Adhesive 2 | |
| --- | --- | --- |
| | Example 27 | Comparative Example 5 |
| Supplied fluid | Isopropyl alcohol | — |
| Exhaust rate/volute | 0.4 | 0.45 |
| Degree of ultimate vacuum | −60 | −95 |
| Introduced amount of fluid (HM ratio) | 0.3% | 0.0% |
| TVOC ppm | 9 | 38 |

TABLE 5

| | Adhesive 3 | |
| --- | --- | --- |
| | Example 28 | Comparative Example 6 |
| Supplied fluid | Isopropyl alcohol | — |
| Exhaust rate/volume | 0.4 | 0.45 |
| Degree of ultimate vacuum | −60 | −95 |
| Introduced ameunt of fluid (HM ratio) | 0.3% | 0.0% |
| TVOC ppm | 9 | 39 |

TABLE 6

| | Adhesive 4 | |
| --- | --- | --- |
| | Example 29 | Comparative Example 7 |
| Supplied fluid | Isopropyl alcohol | — |
| Exhaust rate/volume | 0.4 | 0.45 |
| Degree of ultimate vacuum | −60 | −95 |
| Introduced amount of fluid (HM ratio) | 0.3% | 0.0% |
| TVOC ppm | 10 | 42 |

TABLE 7

| | Adhesive 5 | |
| --- | --- | --- |
| | Example 30 | Comparative Example 8 |
| Supplied fluid | Isopropyl alcohol | — |
| Exhaust rate/volume | 0.4 | 0.45 |
| Degree of ultimate vacuum | −60 | −95 |
| Introduced amount of fluid (HM ratio) | 0.3% | 0.0% |
| TVOC ppm | 9 | 41 |

TABLE 8

| | Adhesive 6 | |
| --- | --- | --- |
| | Example 31 | Comparative Example 9 |
| Supplied fluid | Isopropyl alcohol | — |
| Exhaust rate/volume | 0.4 | 0.45 |
| Degree of ultimate vacuum | −60 | −95 |
| Introduced amount of fluid (HM ratio) | 0.3% | 0.0% |
| TVOC ppm | 9 | 40 |

Consideration

As clearly seen from the results shown in Tables 1 to 8, each of the hot-melt adhesives (Examples 1 to 31) having various compositions obtained by the producing method according to the present invention had 10 ppm or less of TVOC amount, and had a lowered odor. It was also clear that Examples 2 and 4 to 7 each falling within the corresponding favorable range of the exhaust rate per minute and the degree of ultimate vacuum in the vacuuming step could exert much higher effects. Additionally, the amount of TVOC was confirmed to be remarkably reduceable depending on a condition (Examples 14 to 26).

In contrast, the hot-melt adhesive 1 (olefin hot-melt one) in Comparative Example 1 obtained by using a conventional producing method without introducing a fluid had a large TVOC amount, i.e., 40 ppm. Besides, a shortage of the introduced amount of the fluid (Comparative Examples 2 to 4) was confirmed to result in a failure to sufficiently reduce TOVC like the hot-melt adhesive obtained by using the conventional method. Moreover, each of the hot-melt adhesives 2 to 6 other than the olefin hot-melt one was confirmed to have a large TVOC amount under the same conditions as Comparative Example 1.

This application is based on Japanese Patent Application No. 2019-32653 filed in Japan Patent Office on Feb. 26, 2019, the entire disclosure of which are hereby incorporated by reference.

Although the present invention has been fully described by way of the embodiment with reference to the above-described specific examples, it is to be understood that various changes and/or modifications will be apparent to those skilled in the art. Therefore, unless otherwise such changes and modifications to be made by those skilled in the art depart from the scope of the present invention hereinafter defined, they should be construed as being included therein.

INDUSTRIAL APPLICABILITY

The present invention has a variety of industrial applicability in the technical field concerning a hot-melt adhesive and a method for producing the same.

The invention claimed is:

1. A method for producing a hot-melt adhesive, comprising:
    introducing a fluid into a heating kneader while or after kneading a hot-melt adhesive material in a liquid state, at an amount of 0.3 parts by mass or more with respect to 100 parts by mass of the hot-melt adhesive material; and
    performing vacuuming while heating, stirring, or dispersing the hot-melt adhesive material and the fluid so as to come into contact with each other to remove refractory organic compounds contained in the hot-melt adhesive material, which are adsorbed by the fluid, along with the fluid from the hot-melt adhesive material.

2. The method for producing a hot-melt adhesive according to claim 1, wherein the vacuuming is performed at an exhaust rate in a volume 0.4 or more times larger than a volume of the heating kneader per minute.

3. The method for producing a hot-melt adhesive according to claim 1, wherein the vacuuming is performed at a degree of vacuum higher than a gauge pressure of −60 kPa.

4. The method for producing a hot-melt adhesive according to claim 1, further comprising recovering a fluid containing volatile organic compounds by cooling and condensing an exhaust gas exhausted from the heating kneader.

5. The method for producing a hot-melt adhesive according to claim 4, wherein a recovery rate of the fluid is 60% or higher.

6. The method for producing a hot-melt adhesive according to claim 1, wherein the obtained hot-melt adhesive has 10 ppm or less of residual volatile organic compounds.

7. A hot-melt adhesive obtained by the method according to claim 1, wherein the hot-melt adhesive has 10 ppm or less of residual volatile organic compounds.

8. The method for producing a hot-melt adhesive according to claim 1, wherein the fluid includes at least one selected from the group consisting of a nitrogen gas, an oxygen gas, an argon gas, a helium gas, a carbon dioxide gas, a carbon monoxide gas, an ammonia gas, an air, liquid nitrogen, liquid helium, liquid carbon dioxide, liquid argon, liquid oxygen, methanol, ethanol, 1-propanol, isopropyl alcohol, 2-butanol, normal hexane, diethyl ether, ethyl acetate, acetone, methyl ethyl ketone, tetrahydrofuran, limonene, an aliphatic solvent, and water.

* * * * *